J. W. COUMERILH.
OVEN SHELF.
APPLICATION FILED MAY 28, 1919.
1,351,415.
Patented Aug. 31, 1920.
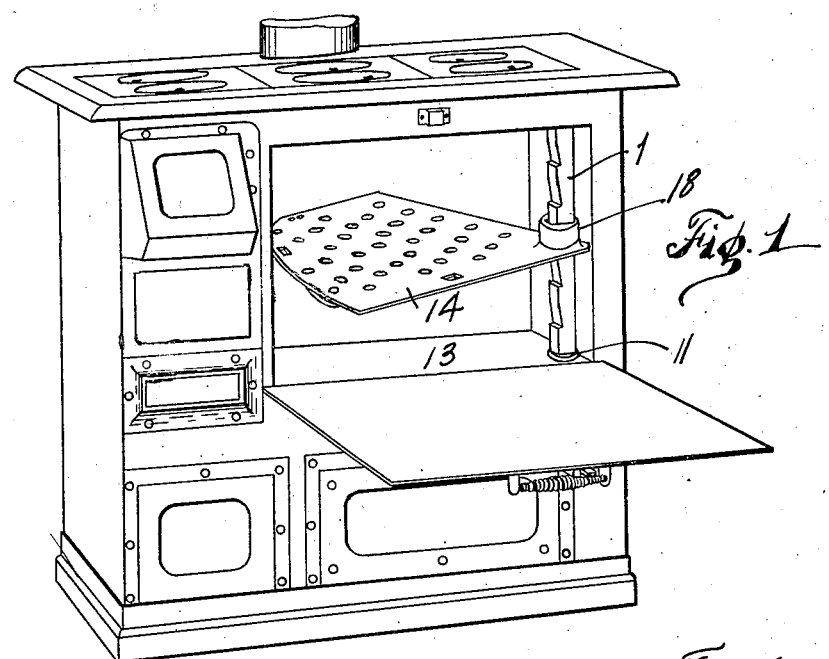
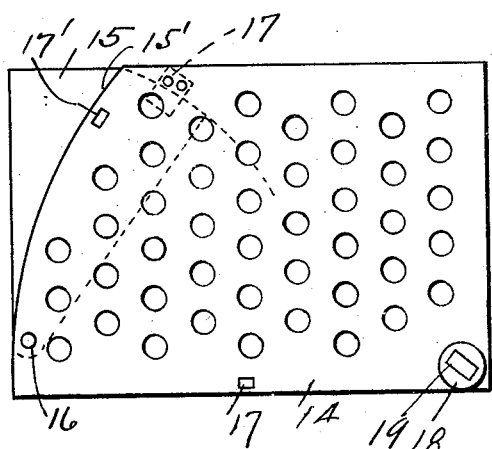
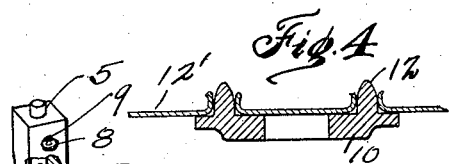
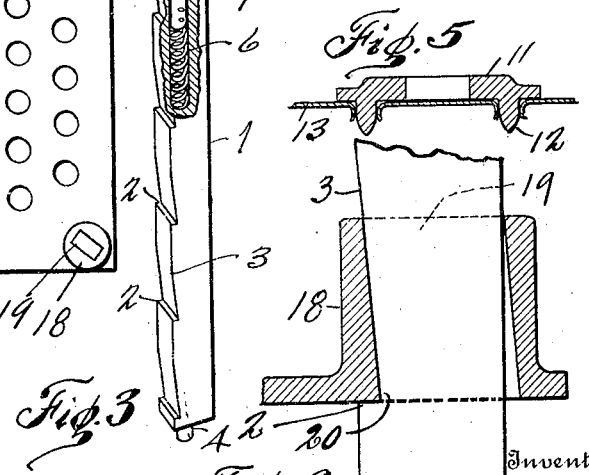
Inventor
John W. Coumerilh
By Herbert E. Smith
Attorney

UNITED STATES PATENT OFFICE.

JOHN W. COUMERILH, OF MULLAN, IDAHO.

OVEN-SHELF.

1,351,415.  Specification of Letters Patent. Patented Aug. 31, 1920.

Application filed May 28, 1919. Serial No. 300,275.

*To all whom it may concern:*

Be it known that I, JOHN W. COUMERILH, a citizen of the United States, residing at Mullan, in the county of Shoshone and State of Idaho, have invented certain new and useful Improvements in Oven-Shelves, of which the following is a specification.

The present invention relates to improvements in oven shelves designed particularly for use with domestic cooking stoves or ranges, to facilitate the cooking operations and provide a convenient means for manipulating the food while baking or cooking in the oven. By the utilization of my invention the bake pan or tray, on the shelf, containing the meat such as a roast to be cooked, may be easily swung out of the oven to give access for basting or inspecting the meat, and the shelf may readily be adjusted as to altitude to secure best results from the heated portions of the oven.

The invention consists in certain novel combinations and arrangements of parts whereby the facile manipulation of the shelf, for basting, inspecting, placing the food in the oven and withdrawing the same therefrom, is accomplished, and also whereby the adjustment of the shelf as to altitude is attained, as will be hereinafter set forth and claimed.

In the accompanying drawings I have illustrated one complete example of the physical embodiment of my invention, the parts being combined and arranged according to the best mode so far devised for the practical application of the principles of my invention.

Figure 1 is a perspective view of a domestic cooking range with the oven door open, showing the shelf of the present invention installed therein, the shelf being partly swung out from the oven for convenience of illustrating it.

Fig. 2 is a top plan view of the shelf, detached.

Fig. 3 is a perspective view of the oscillatable supporting post or standard for the shelf, partly broken away to show a spring bearing pin arrangement in the upper end of the post.

Fig. 4 is a sectional view of the upper bearing ring and Fig. 5 is a sectional view of the lower bearing for the post.

Fig. 6 is a sectional view of the adjusting sleeve for retaining the shelf on the post.

In the preferred embodiment of the invention as shown in the drawings I utilize a metal post 1 preferably cast metal and of the required dimensions, located at the front of the opening at one side of the oven, and especially designed and shaped with a series of spaced shoulders 2 on one of its sides, the face of the post being undercut on oblique lines at 3 to form the shoulder or supporting ledge.

The post or standard is designed to oscillate and therefore is provided with a fixed bottom bearing pin 4, and an upper, spring pressed bearing pin 5 projected beyond the upper end of the post by the spring 6 which is seated in the socketed end of the post and urges the upper pin outwardly. The pin is preferably provided with a series of spaced, transverse openings 7 for the cotter pin 8, which is passed through similar openings 9 in the post and may be slipped through one of the openings 7 to hold the pin in predetermined position.

The two bearing pins of the post have their respective bearing rings, as the upper ring 10 and the lower one 11, both in the shape of open center plates of metal and each provided with a number of spurs 12 to fasten in the upper plate 12' and the lower plate 13 of the oven. When these bearing rings are properly alined and fastened securely in their respective oven plates they form the supports for the oscillatable post which is pivoted by its bearing pins therein and the post may be swung or turned on its pins as desired.

The shelf 14 is preferably of cast metal and approximately rectangular in shape, and perforated as shown to permit equal distribution of the heat in the oven, and in order that the shelf may be adapted to fill the entire horizontal area of the oven, and yet be free to swing into or out of the oven, I provide one end and corner of the shelf with a wing 15, pivoted at 16 on the shelf. This wing is approximately triangular in shape, having one square corner to complete the rectangular outline of the shelf, and is adapted to swing under the shelf at its cut-away end 15', being guided by the lug or flange 17 secured at the under side of the shelf near its curved edge. The shelf may also be provided with sockets 17' to the required number and located at proper places for convenience in handling the shelf by use of stove-lid lifters, in the usual way.

At one corner of the shelf is secured the flanged retaining thimble 18 which is of proper size for its purpose, and of metal, and preferably formed with a cylindrical exterior, but fashioned with a socket or bore 19 extending vertically through, that is rectangular in cross area and complementary to the cross area of the post with which it coacts to support the shelf. The thimble is attached at the upper side of the shelf, in one corner and the shelf is provided with a registered opening for the thimble.

It will be noted that the socket has parallel side walls and parallel end walls, but the end walls are inclined to the perpendicular, the angle of inclination being the same as that of the undercut face 3 of the post above its shoulder 2, and when the shelf is being supported on the post, the edge 20 of the thimble rests snugly in the space above and on the shoulder of the post, with the inclined faces in close contact and the shoulder supporting the load.

It will readily be seen that the shelf, through its thimble, may readily be slipped over the end of the post, before it is placed in the oven, while the shelf is slightly tipped up at its wing end, and while held in this position relative to the post, may be dropped to the desired shoulder and then when the support of the winged end of the shelf is released, the weight of the shelf imposes the load on the shoulder and the shelf falls to a horizontal, supported position. After the lower fixed pin has been entered in its bearing socket, the pin 5 may be retracted and so held by a cotter 8, and the post alined with the two bearing rings. Then the cotter is withdrawn and the spring 6 pushes the upper pin into its bearing socket and the post is now in operative position. The cotter may be passed through the holes 9 in the post and the alined or registering opening 7 in the upper pin to make a positive attachment of the upper pin with its post.

It will readily be apparent that the shelf may be swung into and out from the oven in horizontal plane, and the wing of the shelf permits it to swing on its pivot, and likewise forms a part of the supporting shelf when in the oven.

What I claim is—

The combination with an oven having upper and lower plates, of a post fashioned on one side with spaced shoulders and inclined faces, a non-rotatable shelf on the post formed with a supporting thimble adapted to co-act with the inclined faces on the post and rest on a shoulder, alined bearing rings secured in said plates, bearing pins on the post operative in said rings, and one of said pins having spring connection with the post for the purpose specified.

In testimony whereof I affix my signature.

JOHN W. COUMERILH.